US012617347B2

(12) United States Patent
Lopez et al.

(10) Patent No.: US 12,617,347 B2
(45) Date of Patent: May 5, 2026

(54) ADJUSTABLE LOAD FLOOR SYSTEM FOR A VEHICLE

(71) Applicant: GM Global Technology Operations LLC, Detroit, MI (US)

(72) Inventors: Jorge Ismael Lopez, El Marques (MX); Hector Alejandro Castro, Toluca de Lerdo (MX); Joaquin Hidalgo, Toluca (MX); Omar Rene Hernandez, Estado de Mexico (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 392 days.

(21) Appl. No.: 18/333,834

(22) Filed: Jun. 13, 2023

(65) Prior Publication Data

US 2024/0416841 A1      Dec. 19, 2024

(51) Int. Cl.
B60R 5/04          (2006.01)

(52) U.S. Cl.
CPC .................................... B60R 5/044 (2013.01)

(58) Field of Classification Search
USPC ...................................................... 296/37.16
See application file for complete search history.

(56) References Cited

U.S. PATENT DOCUMENTS 7,401,716 B2 * 7/2008 Svenson .................. B60R 5/045
                                                              224/42.32
8,172,295 B2    5/2012 Fischer et al.

8,256,816 B2     9/2012 Fischer et al.
9,827,914 B2    11/2017 Murray et al.
10,513,225 B2   12/2019 Gawade et al.
10,787,128 B2 *  9/2020 Ngo ........................ B60R 5/044

FOREIGN PATENT DOCUMENTS

DE          10230205 B3     1/2004
DE          10261393 A1     7/2004
DE       102009032892 A1    1/2011
DE       102011114621 A1    4/2013
DE       102014225630 A1    6/2015
                    (Continued)

OTHER PUBLICATIONS

German Office Action for German Application No. 102023129643.4; dated May 26, 2025; 8 pages.

*Primary Examiner* — Joseph D. Pape
(74) *Attorney, Agent, or Firm* — CANTOR COLBURN LLP

(57)          ABSTRACT

An adjustable load floor system for a vehicle includes a support frame including a first side member, a second side member arranged opposite the first side member, and a support member. A first guide member is provided on the first side member. The first guide member includes a first continuous guide track having a first plurality of adjustment lands. A second guide member is provided on the second side member. The second guide member includes a second continuous guide track having a second plurality of adjustment lands. A floor panel includes a first guide element and a second guide element. The first guide element is translatable through the first continuous guide track and the second guide element is translatable through the second continuous guide track to position the support surface in one of a plurality of adjustment positions.

18 Claims, 6 Drawing Sheets

(56)                    References Cited

FOREIGN PATENT DOCUMENTS

| | | | | |
|---|---|---|---|---|
| DE | 102014201458 | A1 | 7/2015 | |
| EP | 1728684 | A1 | 12/2006 | |
| EP | 2008871 | A1 * | 12/2008 | ............ B60R 5/045 |
| JP | 2007091105 | * | 4/2007 | |
| JP | 2007091105 | A | 4/2007 | |
| JP | 2009241825 | A | 10/2009 | |

* cited by examiner

ADJUSTABLE LOAD FLOOR SYSTEM FOR A VEHICLE

INTRODUCTION

The subject disclosure relates to the art of adjustable load surfaces and, more particularly, to an adjustable load floor system for a vehicle.

Vehicles include various options for storing and transporting a wide array of objects. Vehicles include rear storage areas such as trunks and/or forward storage areas such as frunks. Trunks and frunks typically include a fixed volume. Sport utility vehicles (SUVs) and vans typically include rear storage areas that may have an adjustable volume, such as by folding or removing seats. Fixed storage volumes are limited in their usability. Storage volumes that are adjustable by manipulating seats are often impractical as a trade-off must be made between seating and storage.

Certain vehicles may include a storage area having a removeable floor panel. When removed, additional cargo space is revealed and availed for use. When removed, the removeable floor panel must be stored. Storing the removeable floor panel is inconvenient, particularly that the removable floor panel is typically stored in an area remote from the vehicle. In other cases, the removeable floor panel may have a single adjustment position. While the single adjustment position is better than no adjustment, the limited option is often inconvenient for a user. Accordingly, it is desirable to provide an adjustable support surface in a vehicle storage area. Further, it is desirable to provide an adjustable support surface that may be arranged in multiple positions and yet remain in the vehicle.

SUMMARY

An adjustable load floor system for a vehicle, in accordance with a non-limiting example, includes a support frame including a first side member, a second side member arranged opposite the first side member, and a support member extending between the first side member and the second side member. A first guide member is provided on the first side member. The first guide member includes a first continuous guide track having a first plurality of adjustment lands. A second guide member is provided on the second side member. The second guide member includes a second continuous guide track having a second plurality of adjustment lands. A floor panel is coupled to the support frame. The floor panel includes a support surface, a first guide element and a second guide element. The first guide element being translatable through the first continuous guide track and the second guide element being translatable through the second continuous guide track to position the support surface in one of a plurality of adjustment positions defined by the first plurality of adjustment lands and the second plurality of adjustment lands.

In addition to one or more of the features described herein the first side member includes a first upper surface and the second side member includes a second upper surface, the first upper surface including a first opening connected to the first guide member and the second upper surface including a second opening connected to the second guide member.

In addition to one or more of the features described herein each of the first continuous guide track and the second continuous guide track includes an adjustment portion and a return portion.

In addition to one or more of the features described herein each of the first plurality of adjustment lands are spaced along the adjustment portion of the first continuous guide track and each of the second plurality of adjustment lands are arranged along the adjustment portion of the second continuous guide track.

In addition to one or more of the features described herein the first side member includes a first lower edge and the second side member includes a second lower edge, wherein one of the first plurality of adjustment lands is arranged at the first lower edge and one of the second plurality of adjustment lands is arranged at the second lower edge.

In addition to one or more of the features described herein the floor panel includes a first side edge and a second side edge, the first guide element projecting outwardly of the first side edge and the second guide element projecting outwardly of the second side edge.

In addition to one or more of the features described herein the floor panel includes a lower surface, the first guide element being mounted to the lower surface at the first side edge and the second guide element being mounted to the lower surface at the second side edge.

In addition to one or more of the features described herein the first guide element includes a tear drop shape including a first end having a first radius and a second end having a second radius that is distinct from the first radius.

In addition to one or more of the features described herein the first guide element includes a first curvilinear side and a second curvilinear side opposite the first side, the first curvilinear side and the second curvilinear side extending between the first end and the second end.

In addition to one or more of the features described the first curvilinear side is convex and the second curvilinear side is concave.

A vehicle, in accordance with a non-limiting example, includes a body having a cargo zone; and an adjustable load floor system arranged in the cargo zone. The adjustable load floor system includes a support frame including a first side member, a second side member arranged opposite the first side member, and a support member extending between the first side member and the second side member. A first guide member is provided on the first side member. The first guide member includes a first continuous guide track having a first plurality of adjustment lands. A second guide member is provided on the second side member. The second guide member includes a second continuous guide track having a second plurality of adjustment lands. A floor panel is coupled to the support frame. The floor panel including a support surface, a first guide element and a second guide element. The first guide element is translatable through the first continuous guide track and the second guide element is translatable through the second continuous guide track to position the support surface in one of a plurality of adjustment positions defined by the first plurality of adjustment lands and the second plurality of adjustment lands.

In addition to one or more of the features described herein the first side member includes a first upper surface and the second side member includes a second upper surface, the first upper surface including a first opening connected to the first guide member and the second upper surface including a second opening connected to the second guide member.

In addition to one or more of the features described herein each of the first continuous guide track and the second continuous guide track includes an adjustment portion and a return portion.

In addition to one or more of the features described herein each of the first plurality of adjustment lands are spaced along the adjustment portion of the first continuous guide track and each of the second plurality of adjustment lands are arranged along the adjustment portion of the second continuous guide track.

In addition to one or more of the features described herein the first side member includes a first lower edge and the second side member includes a second lower edge, wherein one of the first plurality of adjustment lands is arranged at the first lower edge and one of the second plurality of adjustment lands is arranged at the second lower edge.

In addition to one or more of the features described herein the floor panel includes a first side edge and a second side edge, the first guide element projecting outwardly of the first side edge and the second guide element projecting outwardly of the second side edge.

In addition to one or more of the features described herein the floor panel includes a lower surface, the first guide element being mounted to the lower surface at the first side edge and the second guide element being mounted to the lower surface at the second side edge.

In addition to one or more of the features described herein the first guide element includes a tear drop shape including a first end having a first radius and a second end having a second radius that is distinct from the first radius.

In addition to one or more of the features described herein the first guide element includes a first curvilinear side and a second curvilinear side opposite the curvilinear first side, the first curvilinear side and the second curvilinear side extending between the first end and the second end.

In addition to one or more of the features described herein the first curvilinear side is convex and the second curvilinear side is concave.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
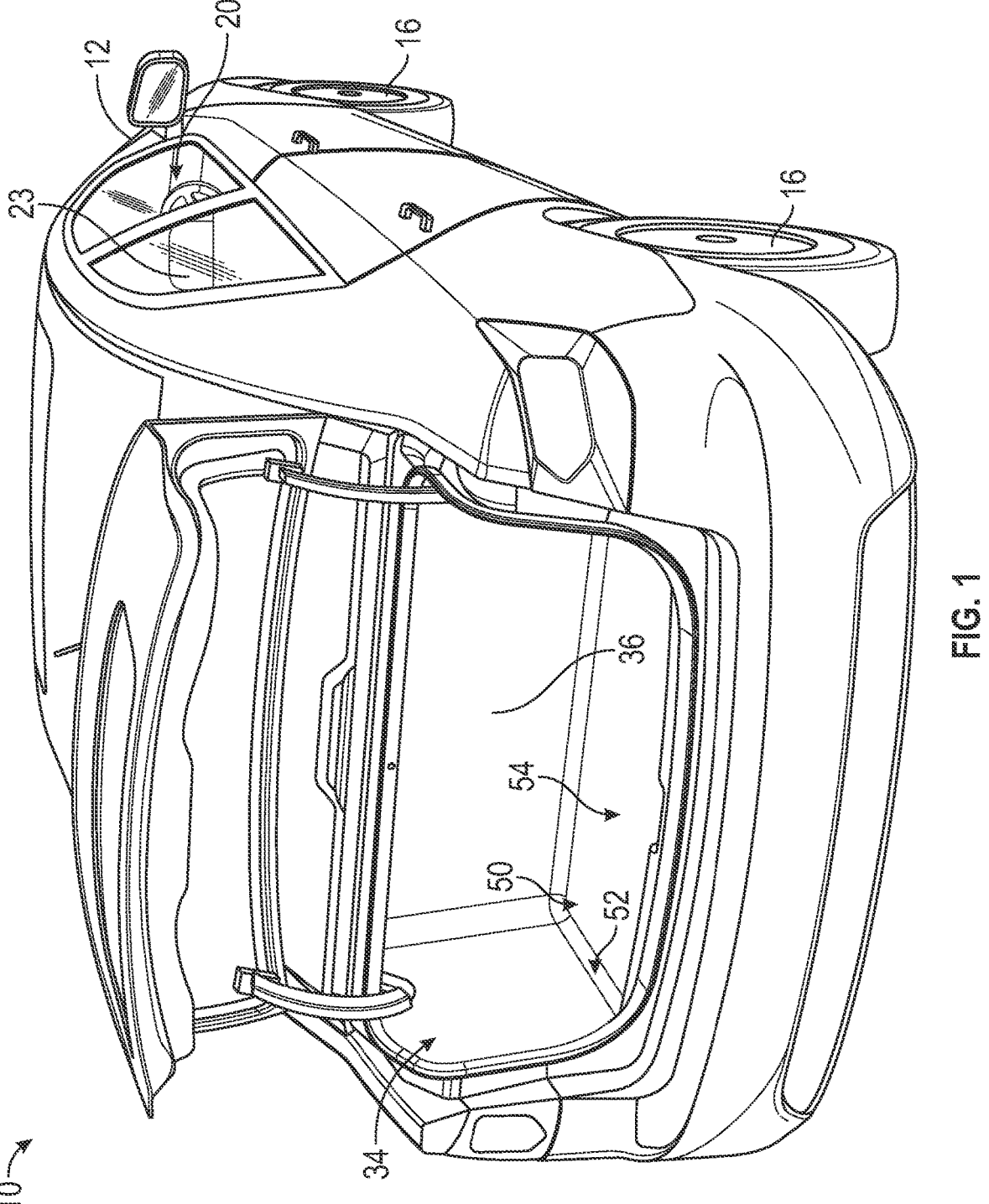
FIG. 1 is a right rear perspective view of a vehicle including an adjustable load floor, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines in part a passenger compartment 20 within which may be arranged a plurality of seats 23, and a cargo zone 34 shown in the form of a trunk 36. Cargo zone 34 may be employed as storage for various items both vehicle related, (e.g., spare tire, tools, and the like) and non-vehicle related, shopping bags, suitcases, and the like, items. Cargo zone 34 includes an adjustable load floor system 50 that may alter an amount of storage volume available in trunk 36. At this point it should be understood that while shown in connection with a rear storage area, (e.g., trunk 36), adjustable load floor system 50 may also be employed in a forward storage area, e.g., a frunk (not shown).

Figure 2:
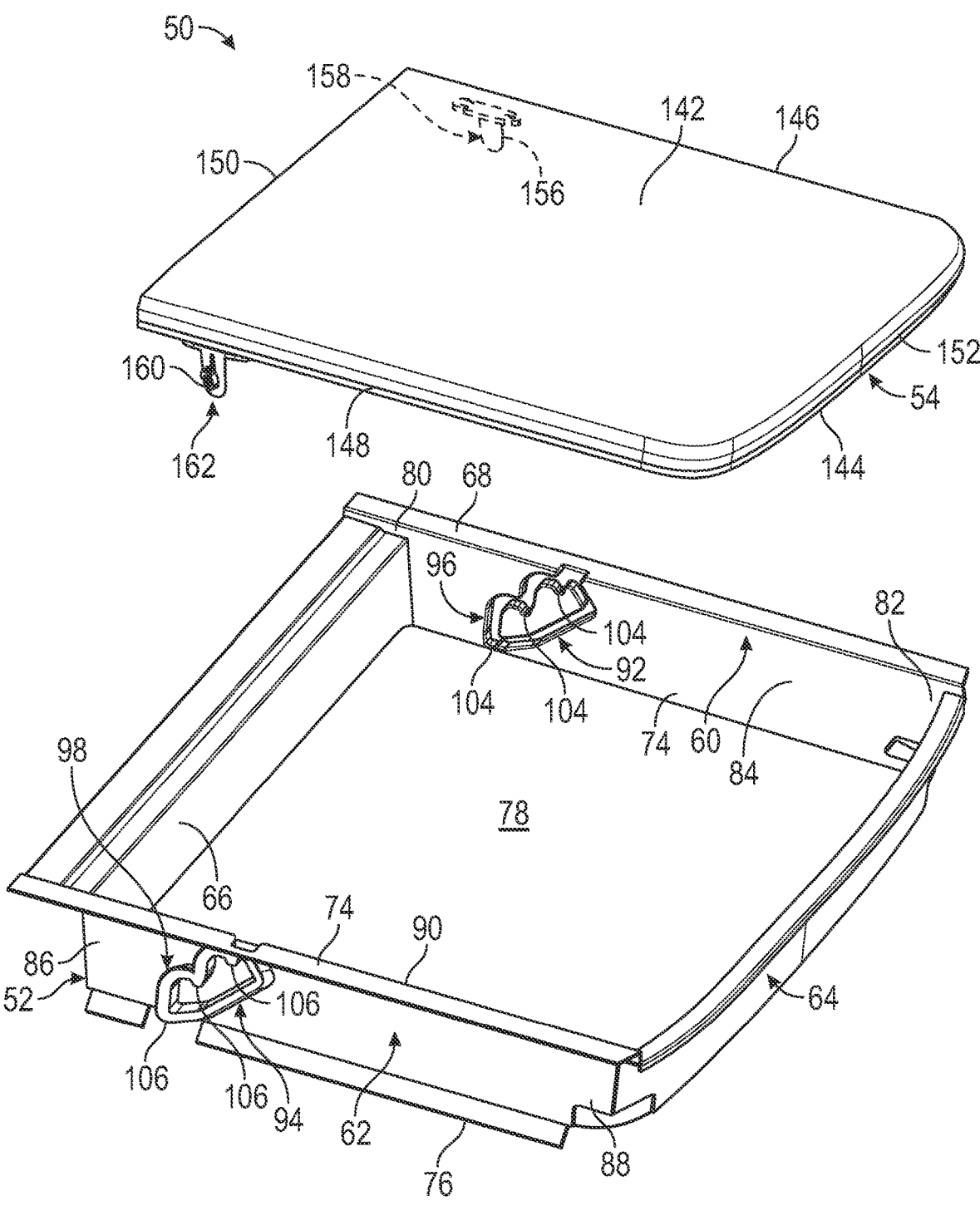
FIG. 2 is a disassembled view of the adjustable load floor including a support frame and a floor panel, in accordance with a non-limiting example.

Referring to FIG. 2 and with continued reference to FIG. 1, adjustable load floor system 50 includes a support frame 52 and a floor panel 54. As will be detailed herein, floor panel 54 is selectively height adjustable in order to change an overall configuration of cargo zone 34. Further, as will be detailed herein, cargo zone 34 may be adjusted without the need to remove and store floor panel 54 remote from vehicle 10. At this point it should be understood that while shown as a separate member, support frame 52 may also be integrated into vehicle 10. That is, interior components (not shown) may be molded to create features of support frame 52.

In a non-limiting example, support frame 52 includes a first side member 60, a second side member 62, a support member 64, and an end wall 66. Support member 64 and end wall 66 extend between and connect first side member 60 and second side member 62. First side member 60 includes a first upper surface 68 and a first lower edge 70. Similarly, second side member 62 includes a second upper surface 74 and a second lower edge 76. A bottom wall 78 extends between and connects first lower edge 70 and second lower edge 76. Bottom wall 78 may also connect with support member 64 and end wall 66.

In a non-limiting example, first side member 60 includes a first end 80, a second end 82, and an inner surface 84. Second side member 62 includes a first end portion 86, a second end portion 88, and an inner surface portion 90. A first guide member 92 is arranged in first side member 60 and a second guide member 94 is arranged on second side member 62. In a non-limiting example, first guide member 92 is formed in first side member 60 adjacent to first end 80. Second guide member 94 is formed in second side member 62 adjacent to first end portion 86. While shown as being integrally formed in each side member 60 and 62, guide members 92 and 94 may be formed in separate structure that is joined to each side member 60, 62.

With continued reference to FIG. 2, first guide member 92 includes a first continuous guide track 96 and second guide member 94 includes a second continuous guide track 98. First continuous guide track 96 includes a first plurality of adjustment lands 104 and second continuous guide track 98 includes a second plurality of adjustment lands 106. First plurality of adjustment lands 104 and second plurality of adjustment lands 106 define discrete adjustment positions for floor panel 54. That is, switching between floor panel 54 between select ones of the first and second pluralities of adjustment lands 104 and 106 will change a height above bottom wall 78.

Figure 3:
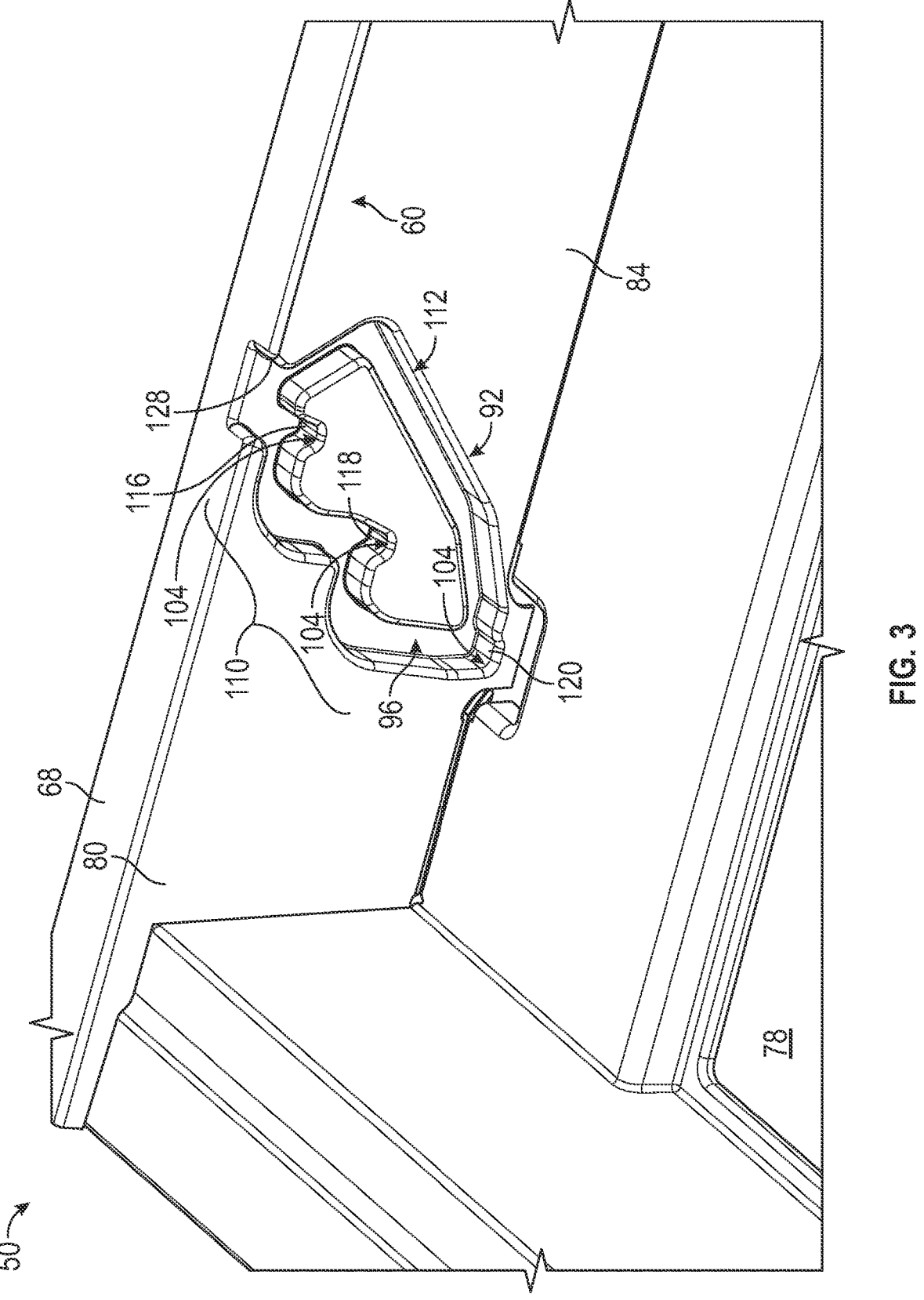
FIG. 3 is an upper right perspective view of a guide track of the support frame of FIG. 2

Reference will now follow to FIG. 3 with continued reference to FIG. 2 in describing first guide member 92 with an understanding that second guide member 94 includes similar structure. In a non-limiting example, first continuous guide track 96 includes an adjustment portion 110 and a return portion 112. Each of the first plurality of adjustment lands 104 are spaced along first continuous guide track 96 in adjustment portion 110. Return portion 112 is an uninterrupted pathway between a lower most one of the first plurality of adjustment lands 104 and an upper most one of the first plurality of adjustment lands 104.

In a non-limiting example, first plurality of adjustment lands 104 includes a first adjustment land 116 arranged near first upper surface 68, a second adjustment land 118, and a third adjustment land 120 arranged at bottom wall 78. At this point, it should be understood that the number and spacing of adjustment lands 104 may vary. First adjustment land 116 defines the upper most adjustment land and third adjustment land 120 defines the lowermost adjustment land. Thus, return portion 112 defines an uninterrupted pathway between third adjustment land 120 and first adjustment land 116. In a non-limiting example, first upper surface 68 includes a first opening 128 that defines an entrance into first guide member 92.

Reference will now follow to FIG. 2 in describing floor panel 54. In a non-limiting example, floor panel 54 includes a support surface 142 and a lower surface 144 that is opposite support surface 142. Floor panel 54 further includes a first side edge 146, a second side edge 148 that is opposite of first side edge 146, a first end section 150, and a second end section 152 that is opposite first end section 150. Second end section 152 selectively rests on support member 64 when floor panel 54 is in an upper most adjustment position.

In a non-limiting example, a first guide element assembly 156 including a first guide element 158 is arranged at first side edge 146 and a second guide element assembly 160 including a second guide element 162 is arranged along second side edge 148. As will be detailed herein, first guide element assembly 158 and second guide element 162 translate through first guide member 92 and second guide member 94 to establish adjustment positions for floor panel 54.

Figure 4:
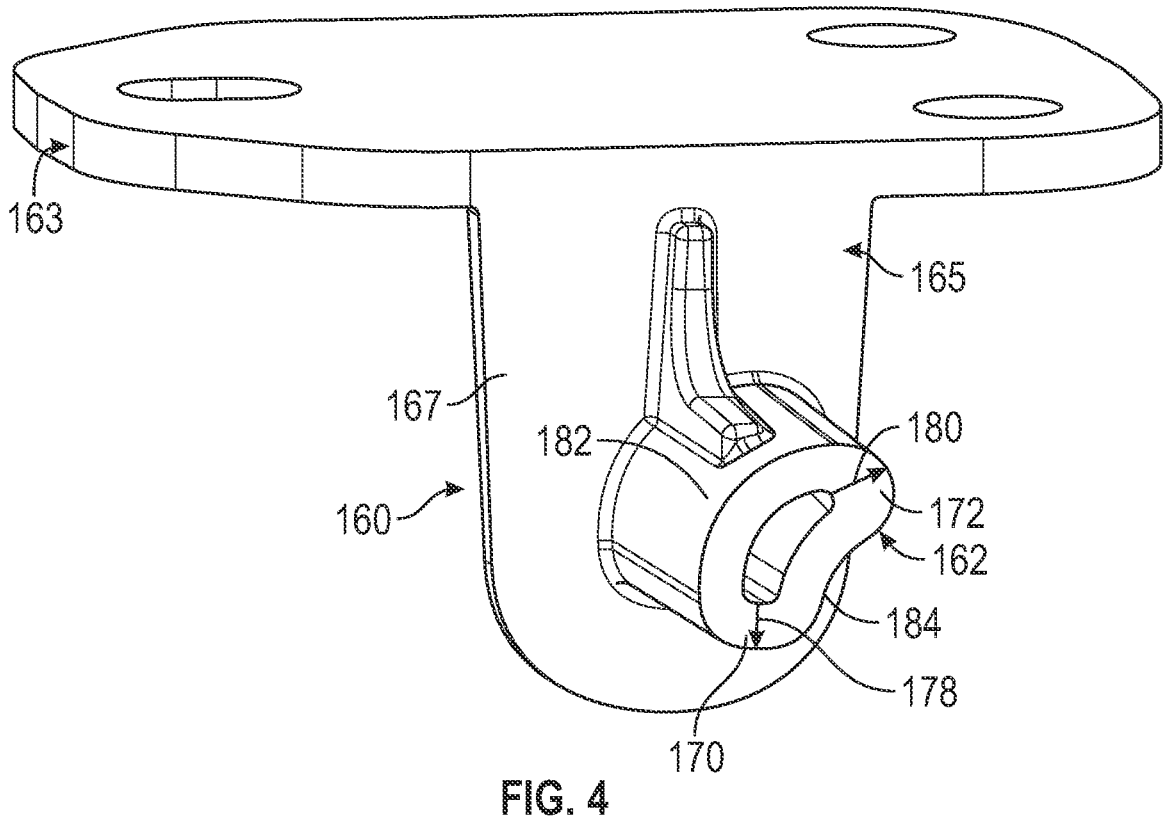
FIG. 4 is an upper left perspective view of a guide element of the floor panel of FIG. 2, in accordance with a non-limiting example.

Reference will now follow to FIG. 4 in describing second guide element assembly 160 with an understanding that first guide element assembly 156 includes corresponding structure. First guide element assembly 160 includes a connector 163 that may be attached to lower surface 144 adjacent to second side edge 148. Connector 163 is formed with a support 165 having an outer surface 167. Second guide element 160 projects outwardly of outer surface 167. Second guide element 160 includes a tear drop or rain drop shape having a first end 170 and a second end 172. Second end 172 is opposite first end 170.

First end 170 includes a first radius 178 and second end 172 includes a second radius 180 that is distinct from first radius 178 thus giving second guide element 160 the teardrop or raindrop shape. Second guide element 160 also includes a first side 182 and a second side 184. First side 182 is convex and second side 184 is concave thereby imparting a bend to the teardrop or raindrop shape. The particular shape of second guide element 160 provides for a smooth transition along second continuous guide track 98 as well as stable seating on each of the second plurality of adjustment lands 106.

Figure 5:
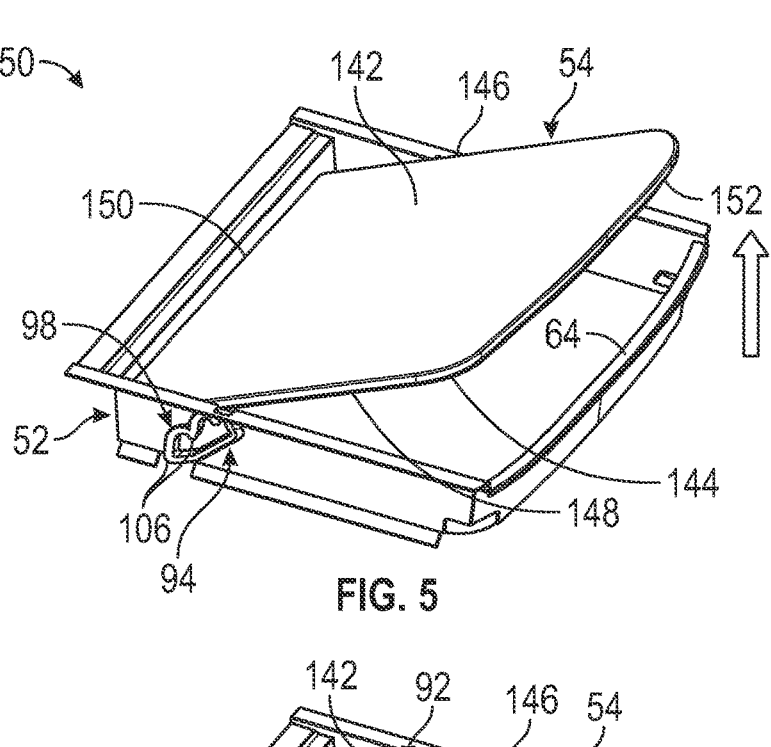
FIG. 5 is an upper right perspective view of the floor panel transitioning from a first adjustment position, in accordance with a non-limiting example.
Figure 6:
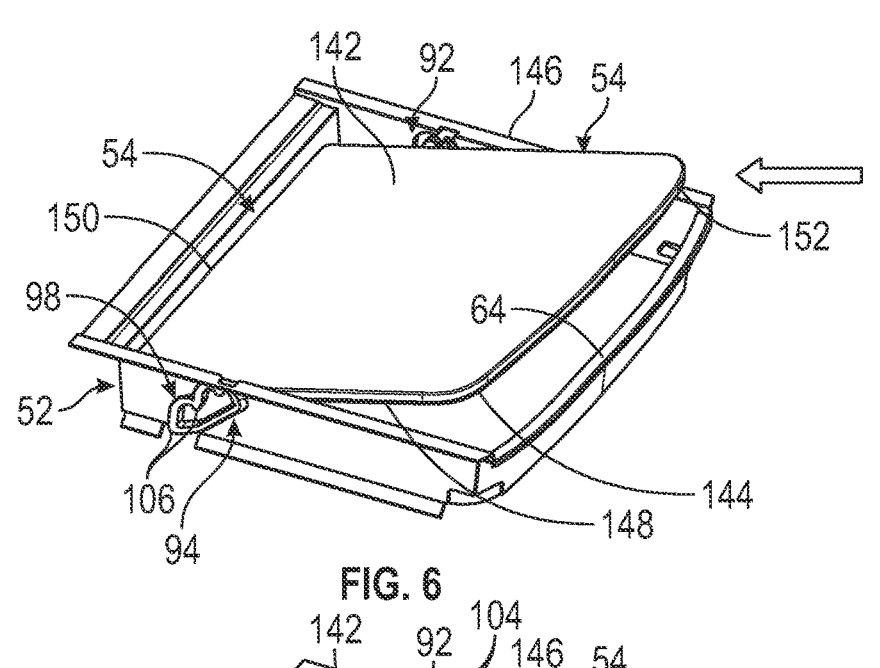
FIG. 6 is an upper right perspective view of the floor panel of FIG. 5 transitioning through a second adjustment position, in accordance with a non-limiting example.
Figure 7:
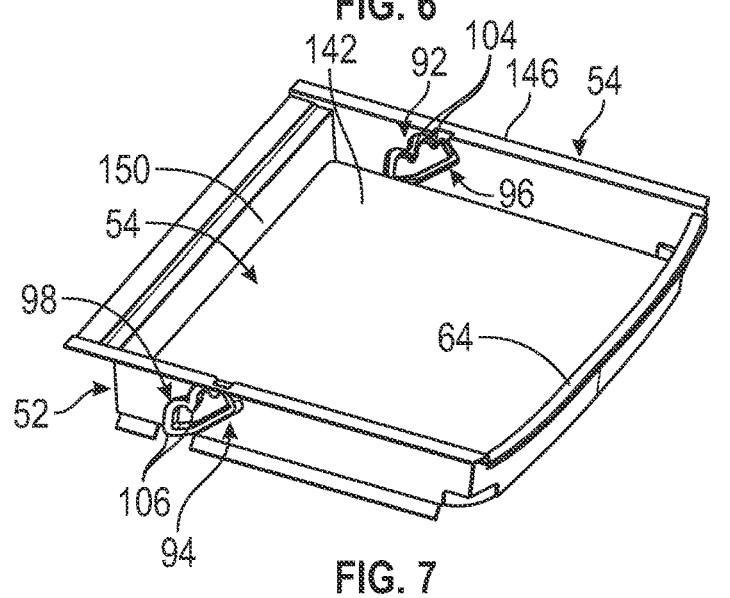
FIG. 7 is an upper right perspective view of the floor panel of FIG. 6 arranged in a third adjustment position, in accordance with a non-limiting example.
Figure 8:
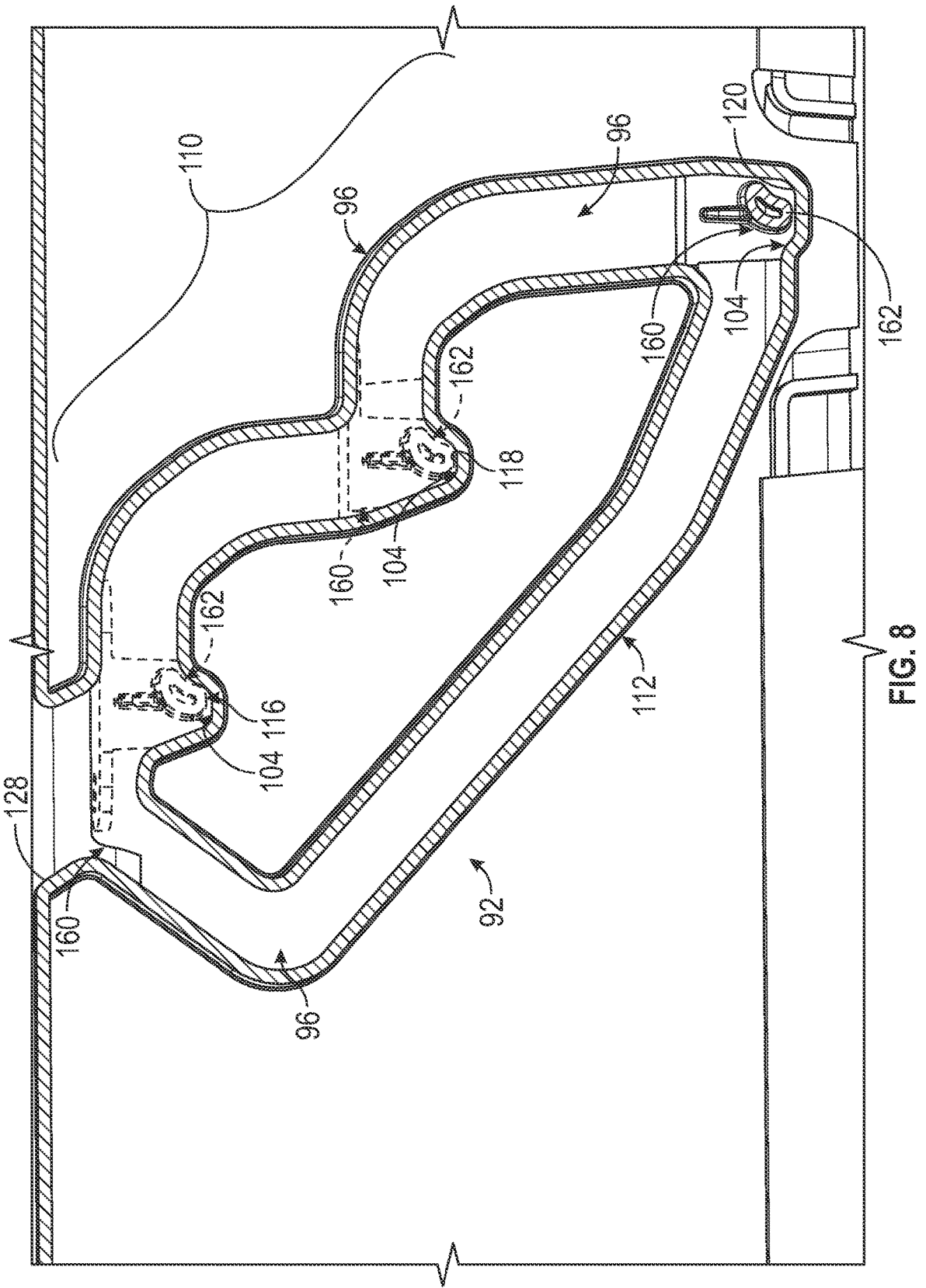
FIG. 8 is a plan view of the guide element transitioning through the guide track from the first adjustment position, through the second adjustment position, and into the third adjustment position, in accordance with a non-limiting example.

Reference will now follow to FIGS. 5, 6, 7, and 8 in describing a transition of floor panel 54 between multiple adjustment positions in accordance with a non-limiting example. Floor panel 54 may be lifted as shown in FIG. 5 by raising second end section 152 from support member 64. At this point, floor panel 54 may be urged forward as shown in FIG. 6 such that first guide element 158 and second guide element 162 travel along corresponding ones of first continuous guide track 96 and second continuous guide track 98 to a second adjustment position. As shown in FIG. 8. In the second adjustment position, first guide element 158 rests upon second adjustment land 118 (FIG. 3). Second guide element 162 would take a corresponding position in second continuous guide track 98.

Still further forward motion of floor panel 54 as shown in FIG. 7 will deposit first guide element 158 in third adjustment land 120, and establish a corresponding position for second guide element 162, FIG. 8. At this point, floor panel 54 is in a lower most adjustment position. To shift floor panel 54 back to the first adjustment position, FIG. 1, a rearwardly directed force is applied such that first guide element 158 travels along return portion 112 back to first adjustment land 116. The use of continuous guide tracks 96 and 98 in first and second guide members 92 and 94 allows a user to shift the floor panel between multiple adjustment positions. Further, there is no need for remote storage as the floor member may simply be rested in the lower most adjustment position.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An adjustable load floor system for a vehicle comprising:

a support frame including a first side member, a second side member arranged opposite the first side member, and a support member extending between the first side member and the second side member;

a first guide member provided on the first side member, the first guide member including a first continuous guide track having a first plurality of adjustment lands;

a second guide member provided on the second side member, the second guide member including a second continuous guide track having a second plurality of adjustment lands; and a floor panel coupled to the support frame, the floor panel including a support surface, a first guide element and a second guide element, the first guide element being translatable through the first continuous guide track and the second guide element being translatable through the second continuous guide track to position the support surface in one of a plurality of adjustment positions defined by the first plurality of adjustment lands and the second plurality of adjustment lands;

wherein the first guide element includes a tear drop shape including a first end having a first radius and a second end having a second radius that is distinct from the first radius.

2. The adjustable load floor system according to claim 1, wherein the first side member includes a first upper surface and the second side member includes a second upper surface, the first upper surface including a first opening connected to the first guide member and the second upper surface including a second opening connected to the second guide member.

3. The adjustable load floor system according to claim 1, wherein each of the first continuous guide track and the second continuous guide track includes an adjustment portion and a return portion.

4. The adjustable load floor system according to claim 3, wherein each of the first plurality of adjustment lands are spaced along the adjustment portion of the first continuous guide track and each of the second plurality of adjustment lands are arranged along the adjustment portion of the second continuous guide track.

5. The adjustable load floor system according to claim 1, wherein the first side member includes a first lower edge and the second side member includes a second lower edge, wherein one of the first plurality of adjustment lands is arranged at the first lower edge and one of the second plurality of adjustment lands is arranged at the second lower edge.

6. The adjustable load floor system according to claim 1, wherein the floor panel includes a first side edge and a second side edge, the first guide element projecting outwardly of the first side edge and the second guide element projecting outwardly of the second side edge.

7. The adjustable load floor system according to claim 6, wherein the floor panel includes a lower surface, the first guide element being mounted to the lower surface at the first side edge and the second guide element being mounted to the lower surface at the second side edge.

8. The adjustable load floor system according to claim 1, wherein the first guide element includes a first curvilinear side and a second curvilinear side opposite the first side, the first curvilinear side and the second curvilinear side extending between the first end and the second end.

9. The adjustable load floor system according to claim 8, wherein the first curvilinear side is convex and the second curvilinear side is concave.

10. A vehicle comprising:

a body having a cargo zone; and an adjustable load floor system arranged in the cargo zone, the adjustable load floor comprising:

a support frame including a first side member, a second side member arranged opposite the first side member, and a support member extending between the first side member and the second side member;

a first guide member provided on the first side member, the first guide member including a first continuous guide track having a first plurality of adjustment lands;

a second guide member provided on the second side member, the second guide member including a second continuous guide track having a second plurality of adjustment lands; and a floor panel coupled to the support frame, the floor panel including a support surface, a first guide element and a second guide element, the first guide element being translatable through the first continuous guide track and the second guide element being translatable through the second continuous guide track to position the support surface in one of a plurality of adjustment positions defined by the first plurality of adjustment lands and the second plurality of adjustment lands;

wherein the first guide element includes a tear drop shape including a first end having a first radius and a second end having a second radius that is distinct from the first radius.

11. The vehicle according to claim 10, wherein the first side member includes a first upper surface and the second side member includes a second upper surface, the first upper surface including a first opening connected to the first guide member and the second upper surface including a second opening connected to the second guide member.

12. The vehicle according to claim 10, wherein each of the first continuous guide track and the second continuous guide track includes an adjustment portion and a return portion.

13. The vehicle according to claim 3, wherein each of the first plurality of adjustment lands are spaced along the adjustment portion of the first continuous guide track and each of the second plurality of adjustment lands are arranged along the adjustment portion of the second continuous guide track.

14. The vehicle according to claim 10, wherein the first side member includes a first lower edge and the second side member includes a second lower edge, wherein one of the first plurality of adjustment lands is arranged at the first lower edge and one of the second plurality of adjustment lands is arranged at the second lower edge.

15. The vehicle according to claim 10, wherein the floor panel includes a first side edge and a second side edge, the first guide element projecting outwardly of the first side edge and the second guide element projecting outwardly of the second side edge.

16. The vehicle according to claim 15, wherein the floor panel includes a lower surface, the first guide element being mounted to the lower surface at the first side edge and the second guide element being mounted to the lower surface at the second side edge.

17. The vehicle according to claim 10, wherein the first guide element includes a first curvilinear side and a second curvilinear side opposite the first curvilinear side, the first curvilinear side and the second curvilinear side extending between the first end and the second end.

18. The vehicle according to claim 17, wherein the first curvilinear side is convex and the second curvilinear side is concave.

* * * * *